Patented Dec. 9, 1952

2,621,109

UNITED STATES PATENT OFFICE 2,621,109

AUTOCLAVING OF SODIUM STANNATE LIQUORS

Hartmut W. Richter, Rahway, N. J., assignor to Metal & Thermit Corporation, New York, N. Y., a corporation of New Jersey No Drawing. Application May 28, 1947, Serial No. 751,147

7 Claims. (Cl. 23—144)

This invention relates to the treatment of sodium stannate to recover tin oxide therefrom and to simultaneously generate free caustic alkali. It relates further to the production of tin oxide of unusual characteristics.

By conventional methods as heretofore practiced, tin is recovered from stannates such as sodium stannate by precipitation, usually by introducing carbon dioxide or sodium bicarbonate, or acids, into an aqueous solution of the stannate. The tin is obtained in the form of a hydrate which, if tin oxide is desired, must be converted to the oxide. In these methods there is a resulting loss of the alkali values present in the stannate; thus, in the case of sodium stannate the sodium becomes bound up in the form of a sodium salt and is unavailable for use as caustic alkali. According to the present invention, in a single operation tin oxide may be produced from sodium stannate while the alkali associated with the stannate is simultaneously produced or generated in free, uncombined form as caustic soda. The tin oxide is recovered in the form of stannic oxide, which is unusually pure and which exhibits apparent density and other characteristics not heretofore observed in this oxide.

An object of the invention is to produce tin oxide from sodium stannate without loss of alkali values. Another object is to produce tin oxide of high purity and variable physical and chemical characteristics. Other objects and advantages will appear hereinafter.

The invention comprises heating sodium stannate at a temperature in the range of about 150° C. to the critical temperature of water and at a pressure sufficient to maintain a liquid phase throughout said temperature range. As a result of this treatment, stannic oxide and free alkali are formed. Heating under pressure may be continued until no further oxide is formed, at which time the heating may be discontinued, the pressure released, and the oxide and free alkali recovered. The major part of the theoretically possible quantities of oxide and free alkali that can result from a given amount of stannate are, in general, recoverable by the foregoing treatment.

Under the foregoing conditions of temperature and pressure, the stannic oxide is obtained in crystalline form and in a variable state of hydration, the hydration varying with the temperature and being substantially lower than that of tin oxide monohydrate throughout the stated temperature range. The amount of hydration may vary from less than one mol of chemically bound water at about 150° C. to zero mol at higher temperatures, the latter material corresponding to the anhydrous oxide, and intermediate these limits a variety of hydrated forms of oxide may be produced, including the half-hydrate.

By varying certain conditions of treatment, as described below, the apparent density of the tin oxide may be varied over a range of from about 12 to about 50 gr./cu. in. In addition, the oxide is characterized over the oxides produced conventionally, as by precipitation from sodium stannate solution with carbon dioxide or sodium bicarbonate, in having a lesser amount of residual alkali.

The sodium stannate which is employed is desirably in the form of an aqueous solution, which may vary widely in concentration from dilute solutions containing, say, 5% by weight or less of the stannate, to slurries, which contain undissolved stannate, and in which free alkali may or may not be initially present. Less concentrated solutions than those mentioned may be treated, depending upon economic factors. The solutions may or may not contain other constituents such as sodium carbonate, sodium chloride, sodium soaps, and the like.

The temperature of heating is generally in the range of about 150° C. to the critical temperature of water (approximately 374° C.). It has been found that the yield of tin oxide having the novel characteristics described herein tends to be greater at higher temperatures, and for this reason temperatures in excess of 150° C. are preferred. Preferably the lower temperature limit is about 180° C. Water is invariably present in the material undergoing treatment, and sufficient pressure is always employed to maintain a liquid phase at all times during the heating. Thus at the initial temperature of 150° C. the pressure for sodium stannate solutions may be about 70 p. s. i. At higher temperatures the pressure is higher, ranging to 1000–1500 p. s. i. and more. For a given temperature the pressure may be higher than that necessary to maintain a liquid phase. It has been found that for the average stannate solutions comprising merely stannate and water, the steam-water vapor pressure relationship substantially holds.

The time of heating is preferably such as to enable the maximum amount of tin oxide to be formed. Broadly speaking, the time may vary from a few minutes to several hours, but in practice, equilibrium between the sodium stannate and the products resulting from it may be usually attained in about a half hour. In general, the higher the free alkali present in the system, the higher will be the temperature required, and with higher temperatures the time will tend to be shorter.

The invention may be illustrated by the following table of data in which are tabulated the results of a number of experiments in each of which a sodium stannate-containing solution was heated under definite condition of tin and initial free alkali concentrations, temperature, pressure and time.

drochloric and in aqueous alkalies such as boiling 10 to 50% sodium hydroxide. For example, the oxide produced at an autoclaving temperature of about 150° C. is substantially insoluble in acids and alkalies such as those mentioned, while the oxide produced at 180° C. is 100% insoluble in the said acids and alkalies.

The oxide has a high apparent density which may be varied from about 12 g./cu. in., or less, to at least 40, or even 50, gr./cu. in. by varying certain of the autoclaving conditions, such as the use or non-use of agitation, the tin concentration of the original stannate, and the initial free alkali concentration. For example, the effect of

| Example No. | Material Treated | | Temp., °C. | Gauge Press., p. s. i. | Heating Time, hrs. | Filtrate | | Tin Recovery, Percent | Free Alkali Generated, Percent [4] |
|---|---|---|---|---|---|---|---|---|---|
| | Sodium Stannate, g./l. of Tin | Free Caustic Soda (NaOH), g./l. | | | | Tin, g./l. | Free NaOH, g./l. | | |
| 1 | 94.5 | 6.8 | 235 | 430 | 3 | 29.6 | 48.7 | 68.6 | 94 |
| 2 | 91.5 | 6.8 | 280 | 900 | 3 | 8.8 | | 90.5 | |
| 3 | 91.5 | 21.7 | 280 | 900 | ½ | 12.0 | 74.0 | 87 | 97 |
| 4 | 173.6 | 10.2 | 300 | 1,260 | ½ | 27.3 | 110.1 | 84 | 100+ |
| 5 | [1] 100.7 | 1.5 | 290 | 1,070 | 1 | 9.4 | 62.6 | 91 | 99 |
| 6 | [2] 300 | 0 | 300 | 1,260 | 1 | 42.5 | 132 | 68 | 66 |
| 7 | [3] 78.4 | 9.8 | 276 | 1,000 | 1 | 15.0 | 41.2 | 81 | 60 |

[1] Solution contained 52.9 g./l. sodium carbonate expressed as sodium hydroxide.
[2] A slurry.
[3] An impure solution containing sodium carbonate, sodium chloride, sodium nitrate, sodium sulfate, soaps, etc.
[4] Based on theoretical amount generable.

In each experiment or example the stannate solution appearing in the column "Material Treated" was heated with agitation in an autoclave to the temperature listed and held at such temperature under the time and pressure conditions shown. As a result of such treatment, tin oxide was progressively formed and precipitated in the solution, being separated therefrom at the conclusion of each experiment and leaving a liquid remaining which in the table is referred to as "Filtrate." The tin and free alkali concentration of the filtrate are listed, and in each case it will be noted that the tin concentration is lower than in the original solution, the difference, of course, being due to the tin recovered in the precipitate and tabulated in the column "Tin Recovery, %." Also, it will be seen that in each case the free alkali content of the filtrate is higher than in the original solution, the gain representing the amount of alkali generated from the original stannate, as indicated in the last column of the table.

As described, the tin oxide produced is stannic oxide, which was found to be in the form of a low hydrate, as evidenced by ignition loss determinations. The presence of low hydrate forms of the oxide, with the tendency to approach the anhydrous oxide as the autoclaving temperature approximated the critical temperature of water, is noteworthy in view of the fact that the oxide is produced from an aqueous solution. The oxide is moist, of course, at the time it is separated from the solution, but such moisture may be removed without calcining, leaving a dry, white, particle. The oxide is substantially free from absorbed or residual alkali, of which it contains only about 1 to 2% as Na$_2$O, and is insoluble in relatively concentrated aqueous acids such as boiling 10% hythe initial free alkali is shown by the following results:

| Example No. | Sodium Stannate, g./l. tin | Free Caustic Soda, g./l. | Temp., °C. | Gauge Pressure, p. s. i. | Apparent Density of Tin Oxide Produced, gr./cu. in. |
|---|---|---|---|---|---|
| 8 | 113 | 0 | 280 | 900 | 8.5 |
| 9 | 113 | 24 | 280 | 900 | 42.0 |

Apparent density, of course, is the weight of a unit volume of particles. At about five grams per liter of free caustic soda, tin oxide of apparent density of about 12 gr./cu. in. may be formed. The apparent densities listed above were obtained using a Scott Volumeter.

One of the advantages of tin oxide having a high apparent density is that it provides for an increased equipment utilisation. In other words, if it is desired to smelt the oxide, a greater quantity of a dense oxide can be charged to the smelter than a less dense oxide. Similar economies may be realized in other applications, as in the production of chemicals and in the ceramics field.

It will thus be seen that the invention provides a method of producing tin oxide of varying apparent density within a wide range. Also, the shape of the tin oxide particles may be influenced so as to favor free flowing particles, especially at high apparent densities. Round particles, which are more freely flowing than others, tend to be produced in greater abundance at the higher apparent densities. Also, the particles are characterized during formation of the same by a tendency to agglomerate. Thus, microscopic measurements of the tin oxide produced according to the invention show agglomerates having an average diameter of about 10 to 30 microns, whereas a commercial tin oxide had agglomerates measuring about 2 microns in diameter.

It will be further apparent that tin oxide may be produced from sodium stannate with little or no loss of alkali values.

In the light of the foregoing description, the following is claimed:

1. Method of obtaining substantially pure stannic oxide in crystalline form and free caustic soda which comprises heating an aqueous solution of sodium stannate at a temperature in the range of about 150° C. to the critical temperature of water and at a pressure sufficient to maintain a liquid phase throughout said temperature range, whereby stannic oxide and free caustic soda are formed, continuing the heating until no further oxide is formed, and thereafter separating and recovering said oxide from the remaining solution comprising free caustic soda.

2. Method of obtaining stannic oxide and free caustic soda which comprises heating an aqueous solution of sodium stannate at a temperature in the range of about 150° C. to the critical temperature of water and at a pressure sufficient to maintain a liquid phase throughout said temperature range, whereby stannic oxide and free caustic soda are formed, and continuing the heating until no further oxide is formed.

3. Method of obtaining stannic oxide and free caustic soda which comprises heating aqueous sodium stannate at a temperature in the range of about 150° C. to the critical temperature of water and at a pressure sufficient to maintain a liquid phase throughout said temperature range, whereby stannic oxide and free caustic soda are formed.

4. Method of obtaining stannic oxide which comprises heating an aqueous solution of sodium stannate at a temperature in the range of about 180° C. to the critical temperature of water and at a pressure sufficient to maintain a liquid phase throughout said temperature range, whereby stannic oxide is precipitated in the solution, continuing the heating until no further oxide is precipitated, and thereafter recovering said oxide.

5. Method of producing stannic oxide and free caustic soda which comprises heating an aqueous solution of sodium stannate at a temperature in the range of about 150° C. to the critical temperature of water and at a pressure sufficient to maintain a liquid phase throughout said temperature range, whereby stannic oxide and free caustic soda are formed, the amounts of said oxide and said free caustic soda comprising the major part of the theoretically possible quantities obtainable from said sodium stannate.

6. Method of producing stannic oxide in a variable state of hydration ranging from oxide having less than one mol of chemically bound water to the anhydrous oxide which comprises heating an aqueous solution of sodium stannate at a temperature in the range of about 150° C. to the critical temperature of water and at a pressure sufficient to maintain a liquid phase throughout said temperature range.

7. Method of producing stannic oxide of variable apparent density which comprises heating an aqueous solution comprising sodium stannate and containing about 5 to about 25 grams per liter of free caustic soda at a temperature in the range of about 150° C. to the critical temperature of water and at a pressure sufficient to maintain a liquid phase throughout said temperature range, whereby stannic oxide having an apparent density of about 12 to at least 40 gr. per cu. in. is formed.

HARTMUT W. RICHTER.

REFERENCES CITED

The following references are of record in the file of this patent:

UNITED STATES PATENTS

| Number | Name | Date |
| --- | --- | --- |
| 1,041,895 | Spitz | Oct. 22, 1912 |
| 2,177,551 | Perkins et al. | Oct. 24, 1939 |

OTHER REFERENCES

Mellor, Inorganic and Theoretical Chemistry, vol. 7, pages 396 and 401 (1927), pub. by Longmans, Green and Co., London. (Copy in Division 59.)